United States Patent
Sloat et al.

(10) Patent No.: US 7,640,347 B1
(45) Date of Patent: Dec. 29, 2009

(54) METHOD AND SYSTEM FOR INSERTING POST DATA INTO THE GET REQUEST TO APPLY NORMAL CACHING RULES

(75) Inventors: David E. Sloat, West Hartford, CT (US); Ryan C. Kearny, Kenmore, WA (US)

(73) Assignee: F5 Networks, Inc., Seattle, WA (US)

( * ) Notice: Subject to any disclaimer, the term of this patent is extended or adjusted under 35 U.S.C. 154(b) by 454 days.

(21) Appl. No.: 10/139,149

(22) Filed: May 2, 2002

(51) Int. Cl.
*G06F 15/16* (2006.01)
(52) U.S. Cl. .................. 709/228; 709/203; 709/217; 709/230; 709/237; 709/220; 709/222
(58) Field of Classification Search ............ 709/203, 709/201, 217, 219, 200, 228, 222, 230, 237; 707/1; 711/1, 3, 100, 113, 118, 123; 370/546
See application file for complete search history.

(56) References Cited

U.S. PATENT DOCUMENTS

| | | | | |
|---|---|---|---|---|
| 5,282,201 A * | 1/1994 | Frank et al. | ................. | 370/403 |
| 6,029,175 A * | 2/2000 | Chow et al. | ............... | 707/104.1 |
| 6,041,365 A * | 3/2000 | Kleinerman | ................ | 719/328 |
| 6,067,558 A * | 5/2000 | Wendt et al. | ................ | 709/202 |
| 6,353,848 B1 * | 3/2002 | Morris | ........................ | 709/203 |
| 6,389,462 B1 * | 5/2002 | Cohen et al. | ................ | 709/218 |
| 6,578,069 B1 * | 6/2003 | Hopmann et al. | ........... | 709/203 |
| 6,615,267 B1 * | 9/2003 | Whalen et al. | .............. | 709/229 |
| 6,701,415 B1 * | 3/2004 | Hendren, III | ............... | 711/138 |
| 6,865,593 B1 * | 3/2005 | Reshef et al. | ................ | 709/203 |
| 7,240,100 B1 * | 7/2007 | Wein et al. | ................... | 709/214 |
| 2002/0065848 A1 * | 5/2002 | Walker et al. | ............... | 707/511 |
| 2002/0103823 A1 * | 8/2002 | Jackson et al. | ........... | 707/501.1 |
| 2002/0162118 A1 * | 10/2002 | Levy et al. | .................. | 725/110 |
| 2002/0198956 A1 * | 12/2002 | Dunshea et al. | ............. | 709/214 |
| 2003/0191812 A1 * | 10/2003 | Agarwalla et al. | .......... | 709/217 |

FOREIGN PATENT DOCUMENTS

| | | | |
|---|---|---|---|
| EP | 1081918 | * | 8/2000 |
| WO | WO 0058870 | * | 10/2000 |

OTHER PUBLICATIONS

*Oracle9iAS Web Cache Technical White Paper*; Author: Jesse Anton dated Jun. 2001; pp. 1-56.

* cited by examiner

*Primary Examiner*—Kenny S Lin
*Assistant Examiner*—Lan-Dai T Truong
(74) *Attorney, Agent, or Firm*—Nixon Peabody LLP (57) ABSTRACT

A method and system for caching HTTP POST requested content using standard caching rules associated with HTTP GET requests are disclosed. When a POST request is received, it is transformed into a GET request with an identifying tag. The identifying tag includes an index value that is unique to the POST request and is based on the POST request's URL and payload. When the POST request has not been encountered before the POST request's URL and payload is stored in a data store. The client then receives a redirect response including the GET request with the identifying tag that it uses to request the data. When the ensuing GET request with the identifying tag is received it is determined if the requested content has been cached. If so, the cached content is returned to the client. Otherwise, the original POST request is recreated and sent to the origin server to retrieve the content. The returned content is sent to the client and is cached using the GET request with the identifying tag.

12 Claims, 10 Drawing Sheets

METHOD AND SYSTEM FOR INSERTING POST DATA INTO THE GET REQUEST TO APPLY NORMAL CACHING RULES

FIELD OF THE INVENTION

This application relates generally to caching content on a network, and, more specifically, to caching response data from HTTP POST requests.

BACKGROUND

The World Wide Web (WWW) provides access to a vast amount of information. At times, some information is accessed much more frequently than other information. At other times, information that was frequently accessed previously becomes less frequently accessed. For example, when a hot news story is first published on the WWW, many users may request the Web page featuring the story. As the story becomes older and other stories are published, the Web page may be requested less frequently. Eventually, the Web page may be requested seldom if at all.

Similarly, a company may announce a new product and post information on its Web site about the product. Initially, many users may request Web pages regarding the product. These requests may follow a certain pattern each day. For example, during morning working hours, requests for Web pages regarding the product may spike. Later in the day, requests for the Web pages may decrease. At night, relatively few requests for the pages may be received.

A company may place information on a Web page for a variety of reasons. For example, it may place information on Web pages to attract potential customers, inform employees, or establish a presence on the Web. When a user is required to wait too long for a Web page to be served, however, the user often loses interest and decides to visit other Web sites or pages. Responding too slowly to Web requests may be harmful for sales, decrease worker productivity, or give a company a bad image.

The ability to cache dynamically generated content has become an increasingly popular an important topic for businesses that wish to find and easy and economical way to scale their ability to serve data. While many vendors have a solution that enables them to cache dynamic content requested via an HTTP GET request, the same cannot be said for content requested via an HTTP POST request. A POST request by definition within the HTTP 1.0 specification is an HTTP request that includes a body as part of the request (a payload). Additionally, the default handling of POST requests as defined in the HTTP RFC (RFC 1945) states that POST requests are uncacheable. As such, cache engines are not designed to cache POST requests. According to RFC 1945, one of the main reasons that POST requests are uncacheable is because the application has no way of knowing that the server would return an equivalent response on some future request.

As such, the general assumption is that the queries will be widely varied (within the scope of the data/URL supplied in the POST request line) to the point where caching the results will provide little to no benefit. It is also an assumption that the data returned is frequently changing (also making it undesirable for caching).

Therefore, unless the request is a GET request, the data retrieved by the request will not be cached. There are an increasing number of situations, however, which go against the normal assumptions concerning POST requests and the dynamic data they return. It may be the case that while the response to a POST request is returning data that will in fact change later, it is known that it will be good for a certain extended period of time (for example, 24 hours). It may also be the case that POST requests are being utilized because the data required to obtain the desired result was too much to fit into a URL, and thus the additional space afforded by POST requests was necessary. In these situations and others, it may be beneficial to utilize the functionality of content caches to speed up transactions or to allow efficient scaling of applications. What is needed is a way to cache content requested by a POST request.

SUMMARY

A method and system is directed at caching POST requests using standard caching rules. Aspects of the invention may be embodied in software and/or hardware and on a computer-readable medium and/or in a modulated data signal.

According to one aspect of the invention, when a POST request is received, it is transformed into a GET request with an identifying tag. The identifying tag includes an index value that is unique to the POST request and is based on the POST requests URL and payload.

According to another aspect of the invention, when the POST request has not been encountered before the POST request's URL and payload is stored in a data store.

According to yet another aspect of the invention, the client receives a redirect response including the GET request with the identifying tag that it uses to request the content.

According to still yet another aspect of the invention, when the GET request with the identifying tag is received it is determined if the requested content has been cached. If so, the cached content is returned to the client. Otherwise, the original POST request is recreated and sent to the origin server to retrieve the content. The returned content is sent to the client and is cached using the GET request with the identifying tag.

These and various other features as well as advantages, which characterize the present invention, will be apparent from a reading of the following detailed description and a review of the associated drawings.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In the following description, first an illustrative operating environment in which the invention may be practiced is disclosed. Then, an illustrative arrangement and interaction of elements, is described. Next, methods for caching POST requests are disclosed. Finally, illustrative examples of caching POST requests are described.

Illustrative Operating Environment

Figure 1:
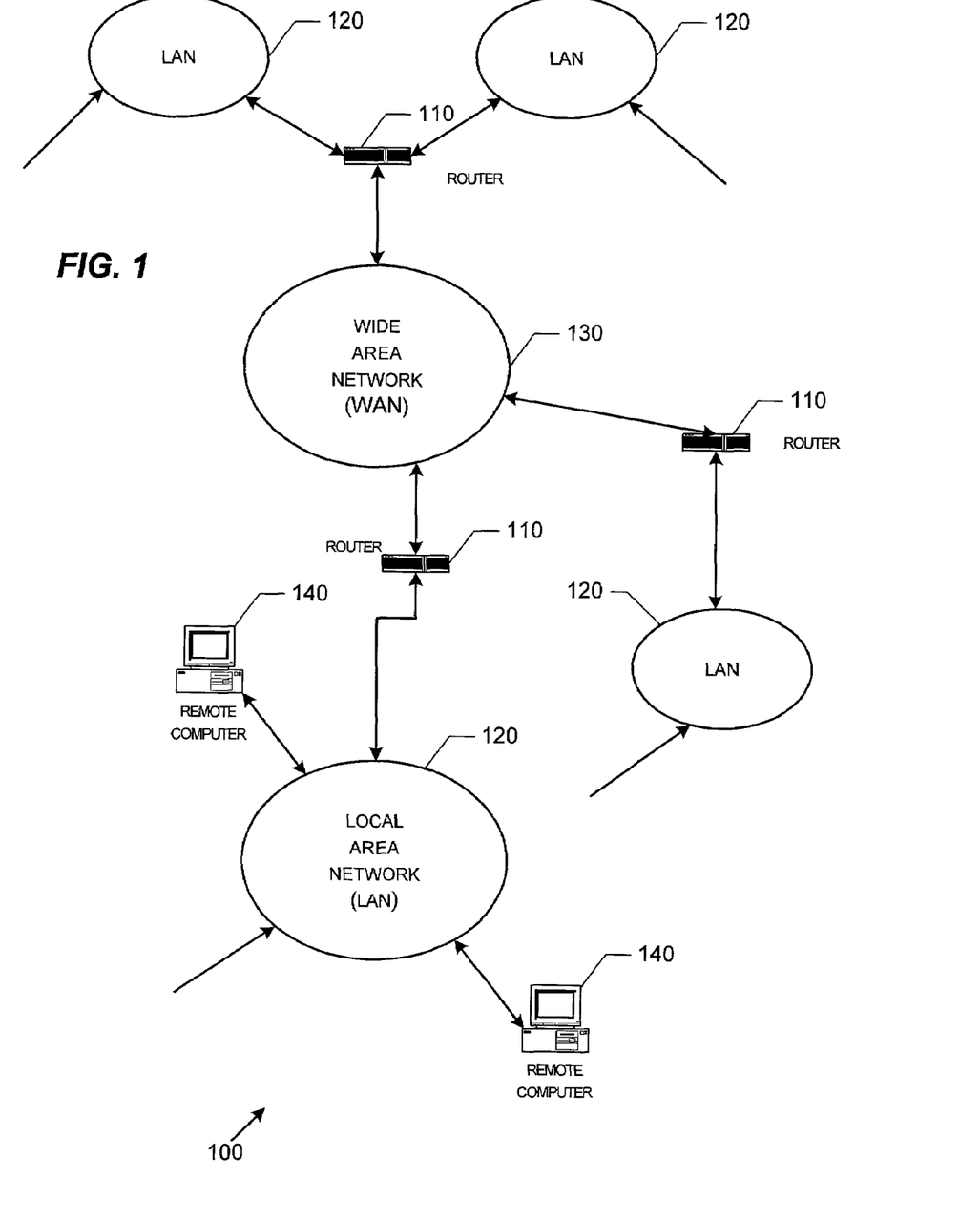
FIGS. 1-3 show components of an exemplary environment in which the invention may be practiced.
Figure 2:
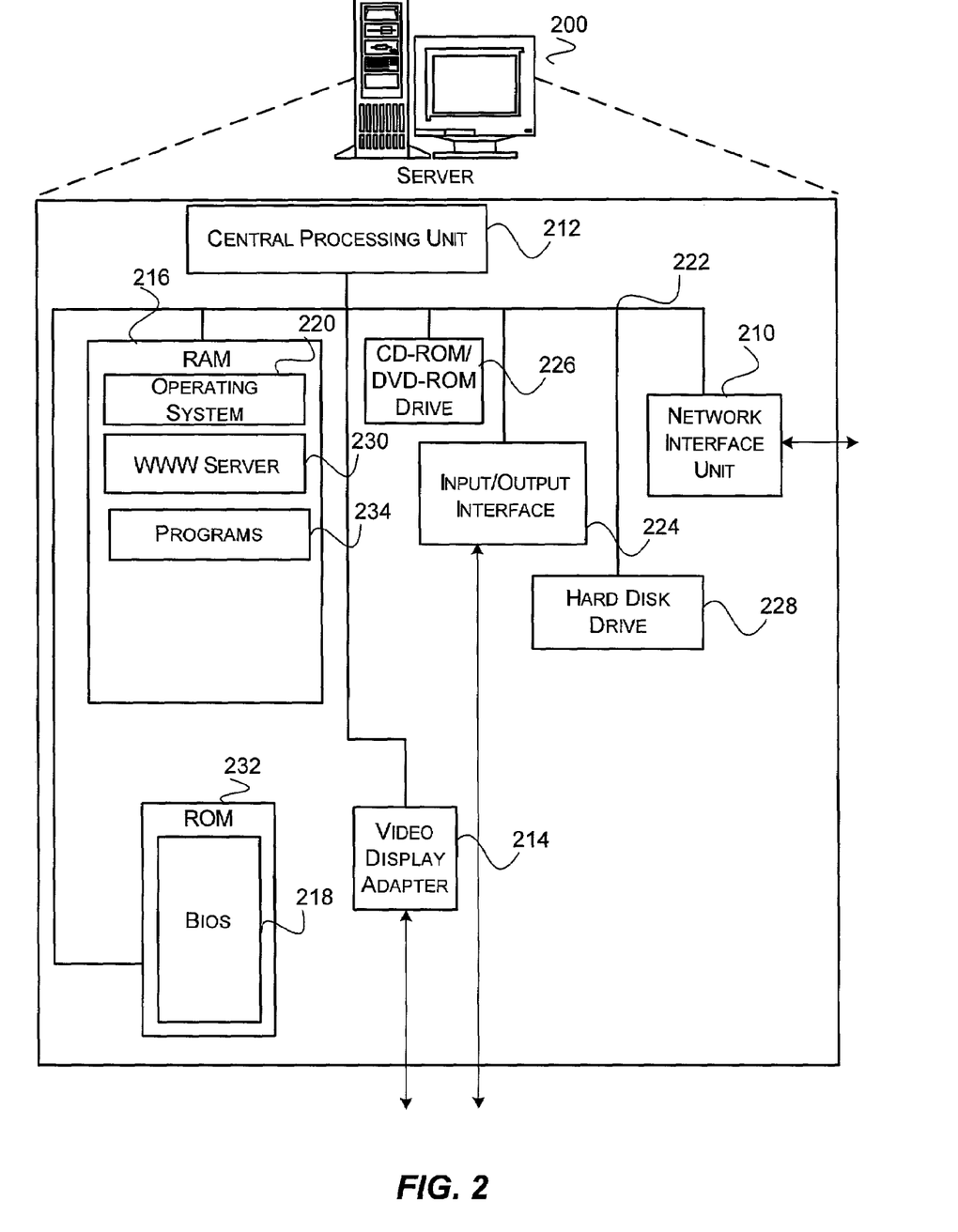
Figure 3:
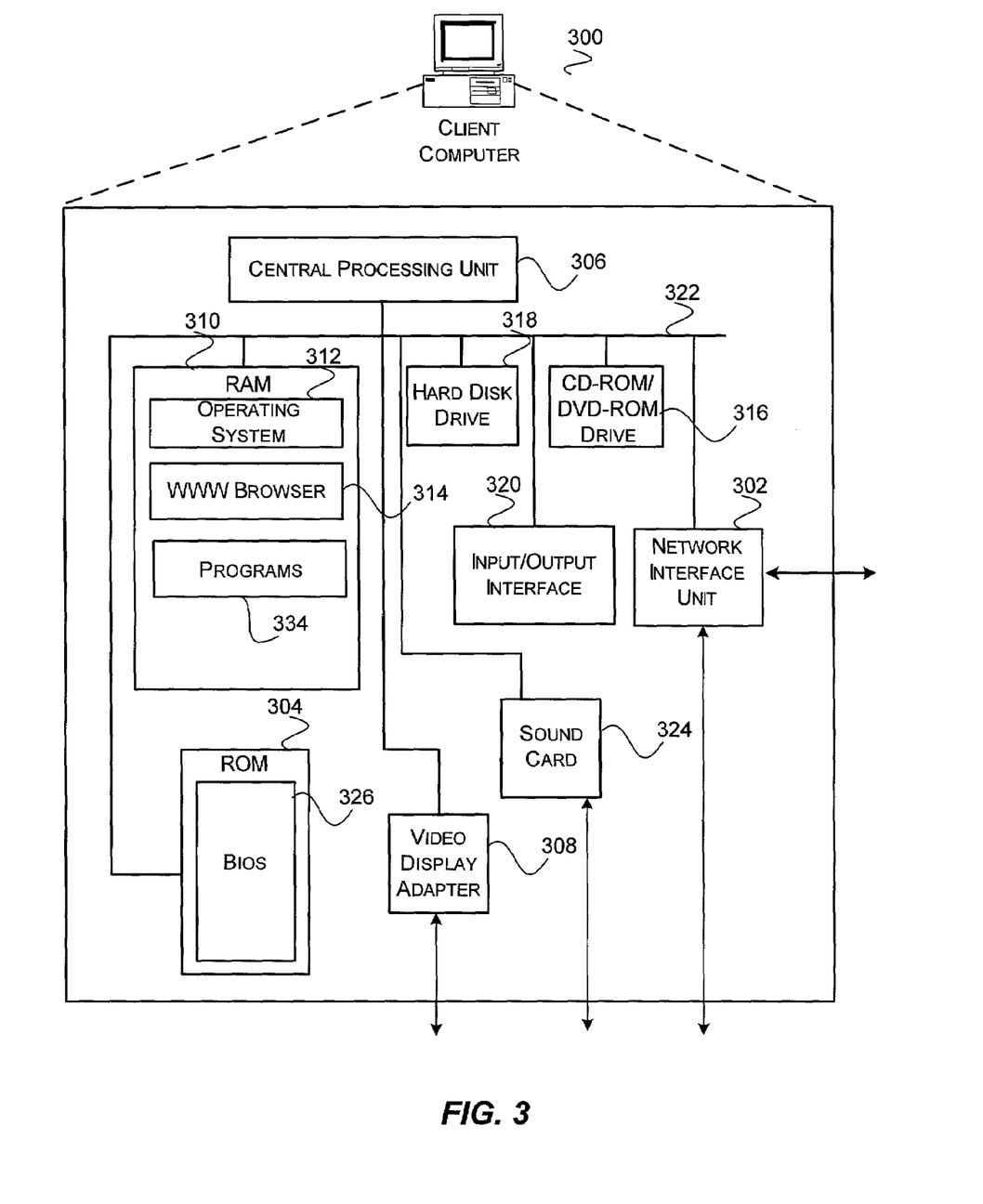

FIGS. 1-3 show components of an exemplary environment in which the invention may be practiced. Not all the components may be required to practice the invention, and variations in the arrangement and type of the components may be made without departing from the spirit or scope of the invention.

FIG. 1 shows a plurality of local area networks ("LANs") 120 and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs 120 or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

A server providing a WWW site, such as the server described in more detail in conjunction with FIG. 2, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER@, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network known to those skilled in the art.

Server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. The network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. This component may comprise a general purpose server operating system, such as UNIX, LINUX™, Microsoft WIDOWS NT®, and the like. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored.

FIG. 3 depicts several components of client computer 300. Client computer 300 may include many more components than those shown in FIG. 3. However, it is not necessary that those generally-conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection as known to those skilled in the art.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

Illustrative Arrangement and Interaction of Elements

Figure 4:
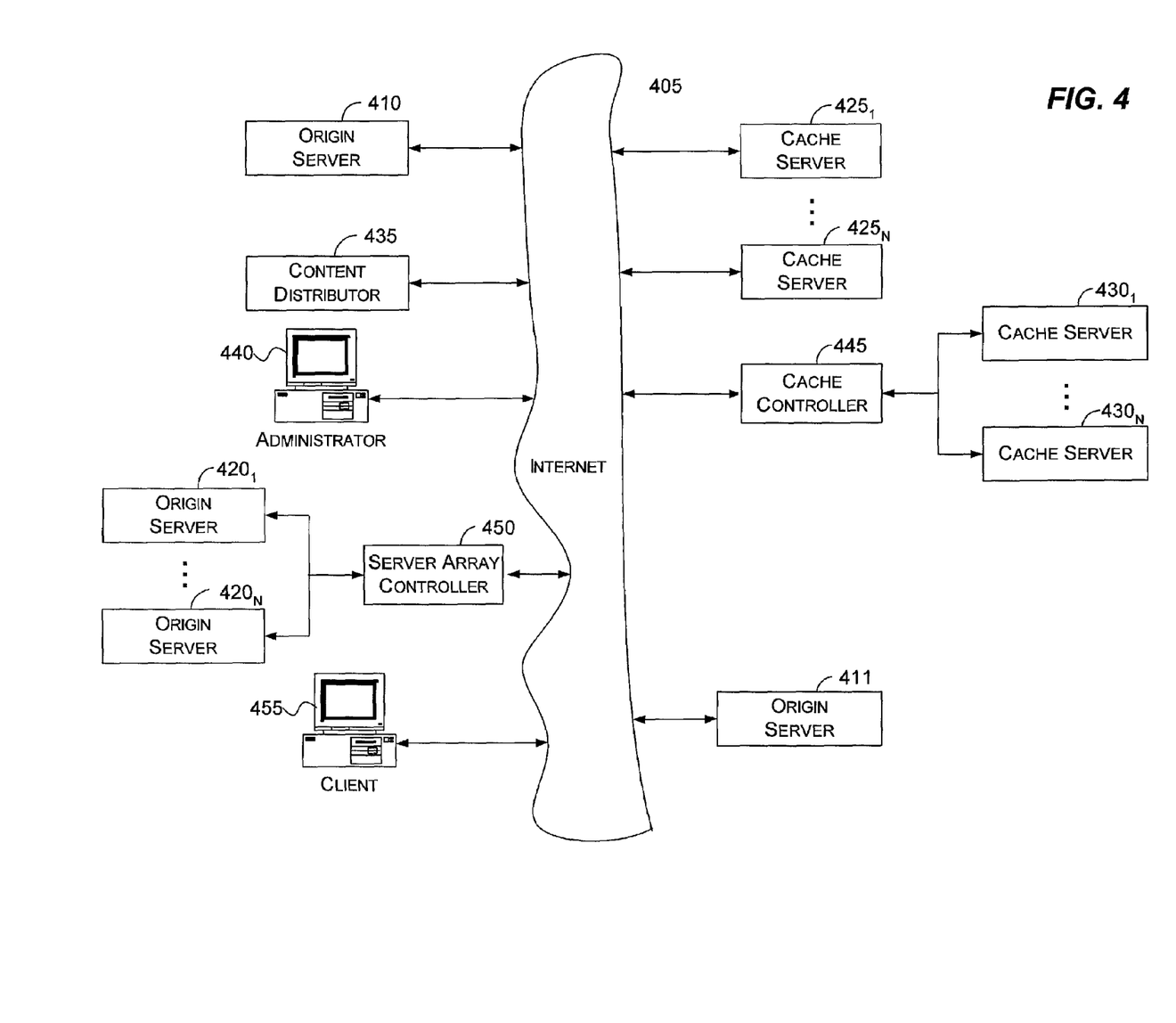
FIG. 4 illustrates an exemplary environment in which the invention operates in which content servers, administrator workstations, client computers, and content distributors are coupled through a wide area network/local area network.

FIG. 4 illustrates an exemplary environment in which the invention operates in which content servers, administrator workstations, client computers, and content distributors are coupled through a wide area network/local area network, according to one embodiment of the invention. The environment includes Internet 405, which is an example of a WAN/LAN, such as WAN/LAN 100 described in conjunction with FIG. 1. In addition, the environment includes origin servers 410-411 and $420_{1-N}$, cache servers $425_{1-N}$ and $430_{1-N}$, content distributor 435, administrator computer 440, cache controller 445, server array controller 450, and client computer 455, each of which are coupled to Internet 405.

Content servers include any server capable of sending content to a requesting device, such as client computer 455. Two such types of content servers are a cache server, such as cache server $425_1$, and an origin server, such as origin server 410. Generally, origin servers are servers which store original (as compared to cached) content. The content stored may be used to generate other content. For example, an origin server may include a database, i.e., original content, having entries about the status of orders. A customer may query the origin server to determine the status of an order placed by the customer. In response to the customer's query, a Web page may be generated that, in addition to the relevant order status, includes advertisements, notices, and/or other information that may be useful to the customer. To conserve storage space and compute resources, such a page is typically generated on request by a program executing on the origin server.

Information about products, such as a product brochure published into a Web page, on the other hand, may be statically stored and not require additional generation. That is, the published Web page showing the product brochure may have no other elements that need to be generated. This is what is generally referred to as a static Web page. Such pages may be created by a Web page developer and then distributed to content servers.

In contrast to origin servers, cache servers cache content and send it to requestors upon request. Generally, cache servers do not generate any additional content than the content they cache (although doing so would not be outside the spirit or scope of this invention). The content may be a copy of content on other servers such as an origin server, a content publishing system (such as content distributor 435), or another cache. By caching frequently requested content, a cache server may greatly decrease the time between a request and a response to the request (known as response latency). Typically, a client, such as client computer 455, may be unaware that the content server responding is a cache server rather than an origin server.

Origin servers, such as origin servers 410-411 and $420_{1-N}$, may be coupled more directly to the Internet or they may be coupled to the Internet through a server array controller, such as server array controller 450. Server array controller 450 may cause origin servers $420_{1-N}$ to appear to requestors as a single origin server. It does this by redirecting a message directed to it to one of origin servers $420_{1-N}$. It may redirect such messages based on many metrics including load balancing metrics. It may perform network address translation (NAT) and/or other translations, such as port address translation (PAT), to maintain the appearance of being a single origin server. Each origin server in FIG. 4 could be replaced with a server array controller controlling an array of origin servers without departing from the spirit or scope of the invention.

Likewise, each cache server, such as one of cache servers $425_{1-N}$ and $430_{1-N}$, may be coupled more directly to the Internet or may be coupled to the Internet through a cache controller, such as cache controller 445. Cache controller 445 may cause cache servers $430_{1-N}$ to appear to requesters as a single unified cache. Similar to a server array controller, it does this by redirecting a message directed to it to one of cache servers $430_{1-N}$. It may redirect such messages based on many metrics including load balancing metrics. It may perform network address translation (NAT) and/or other translations, such as port address translation (PAT), to maintain the appearance of being a single cache server. Each cache server in FIG. 4 could be replaced with a cache controller controlling an array of cache servers without departing from the spirit or scope of the invention. It will be recognized that a cache controller may simply be a server array controller configured to provide access to cache servers.

Cache servers may be arranged in arrays, such as cache servers $425_{1-N}$ and $430_{1-N}$. A device connected to Internet 405, such as a domain name system (DNS) server (not shown), may receive domain name requests from a client or a local domain name system (LDNS) server. The device may direct the client to a cache server or an origin server by returning an IP address associated with the cache or origin server. The device may direct requests depending on network traffic, network topology, capacity of servers, content requested, and a host of other load balancing metrics. The cache servers of cache servers $425_{1-N}$ may be located in one geographical location or may be spread to many different locations. Cache servers $425_{1-N}$ may be coupled to Internet 405 through firewalls or other packet-filtering systems for security and/or other reasons.

Content distributor 435 is a content publishing system. It may provide an automated way for distributing versions of content. For example, it may link to source servers upon which programmers code HTML, executable, and/or image files. Automatically, or upon command, it may gather new or updated content from the source servers. It may store the new or updated content using versioning. Then, it may deliver the new or updated content to content servers. It may coordinate bringing origin servers offline and online and expiring versions of content Administrator computer 440 is an electronic device used to access and control content on content servers. Administrator computer 440 may be used to populate content, expire content, pin certain content into memory, set quotas, and otherwise manipulate cache servers. Administrator computer 440 may also be used to take origin servers offline or bring them online. It may also be used to update content on the origin servers. An exemplary electronic device that may perform the services of administrator computer 440 is client computer 300 of FIG. 3, configured with appropriate software and hardware.

Client computer 455 requests content from content servers. An application that may be used to request content is a WWW browser application as described in detail in conjunction with FIG. 1.

Administrator computer 440 and client computer 455 may be implemented using any devices capable of connecting with Internet 405 and executing instructions. Such devices may include devices that typically connect using a wired communications medium such as personal computers, multiprocessor systems, microprocessor-based or programmable consumer electronics, network PCs, and the like. Such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. In addition, administrator computer 440 and client computer 455 may also include any device that is capable of connecting using a wired or wireless communication medium such as PDAs, POCKET PCs, wearable computers, and other devices mentioned above that are equipped to use a wired and/or wireless communications medium. An exemplary client that may connect with Internet 405 is client computer 300 of FIG. 3.

Process Flow

Figure 5:
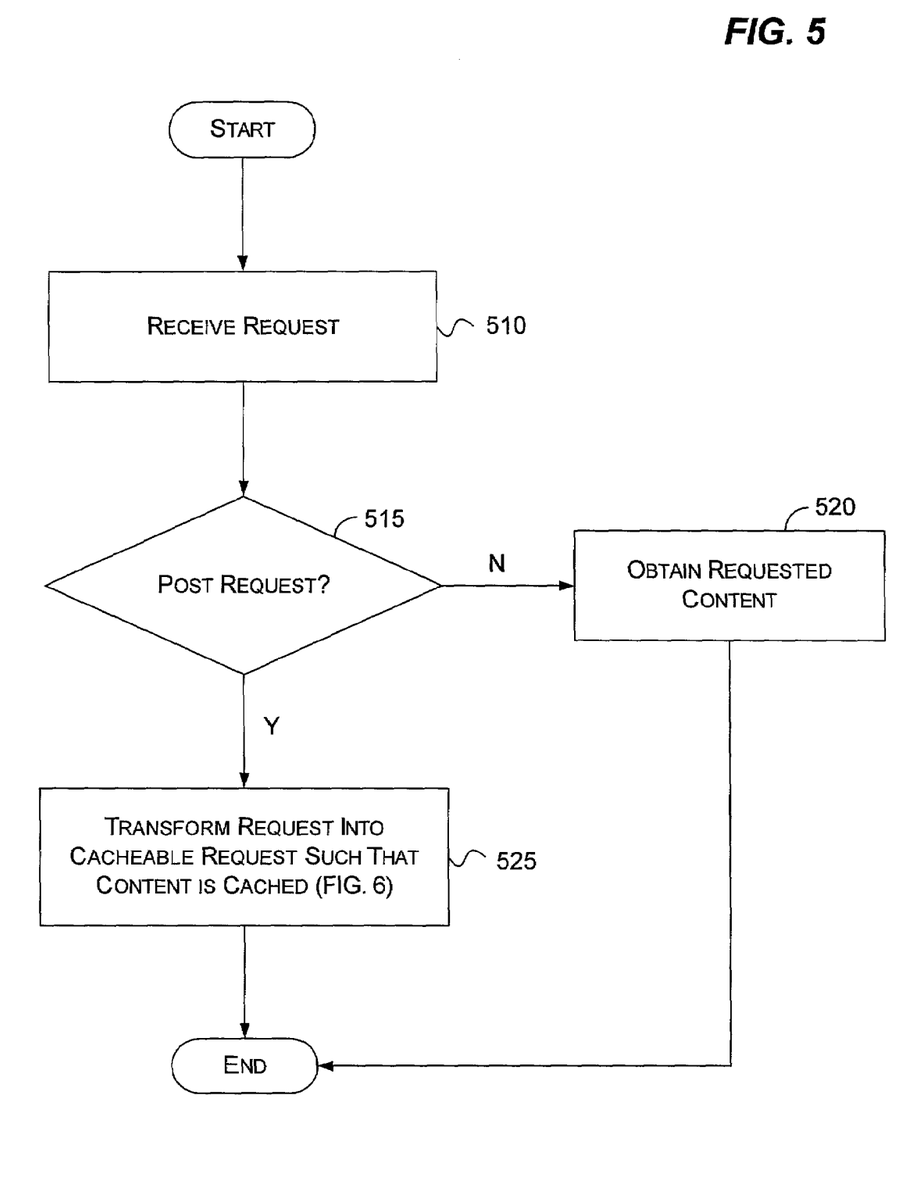
FIG. 5 illustrates a process flow for caching POST requests using caching rules associated with GET requests.

FIG. 5 illustrates a process flow for caching POST requests using caching rules associated with GET requests, according to one embodiment of the invention. After a start block, the process moves to block 510.

At block 510, the request is received. The request may be in the form of a GET request or a POST request that requests content from a location on a network.

Transitioning to decision block 515, a determination is made as to whether the request is in the form of a GET request or a POST request. When the request is a GET request, the process moves to block 520, at which point the requested content is obtained and returned to the client. When cached, the content is returned to the requesting device from a cached location, such as a cache engine, otherwise, the content is retrieved from a server. When the request is a POST request, the process flows to block 525 where the POST request is transformed into a cacheable request. As POST requests are not treated as cacheable by traffic servers, the POST request is transformed into a GET request so that the content that is desired to be retrieved is cached using the caching rules associated with GET requests (See FIG. 6 and related discussion). The process then moves to an end block and returns to processing other actions.

Figure 6:
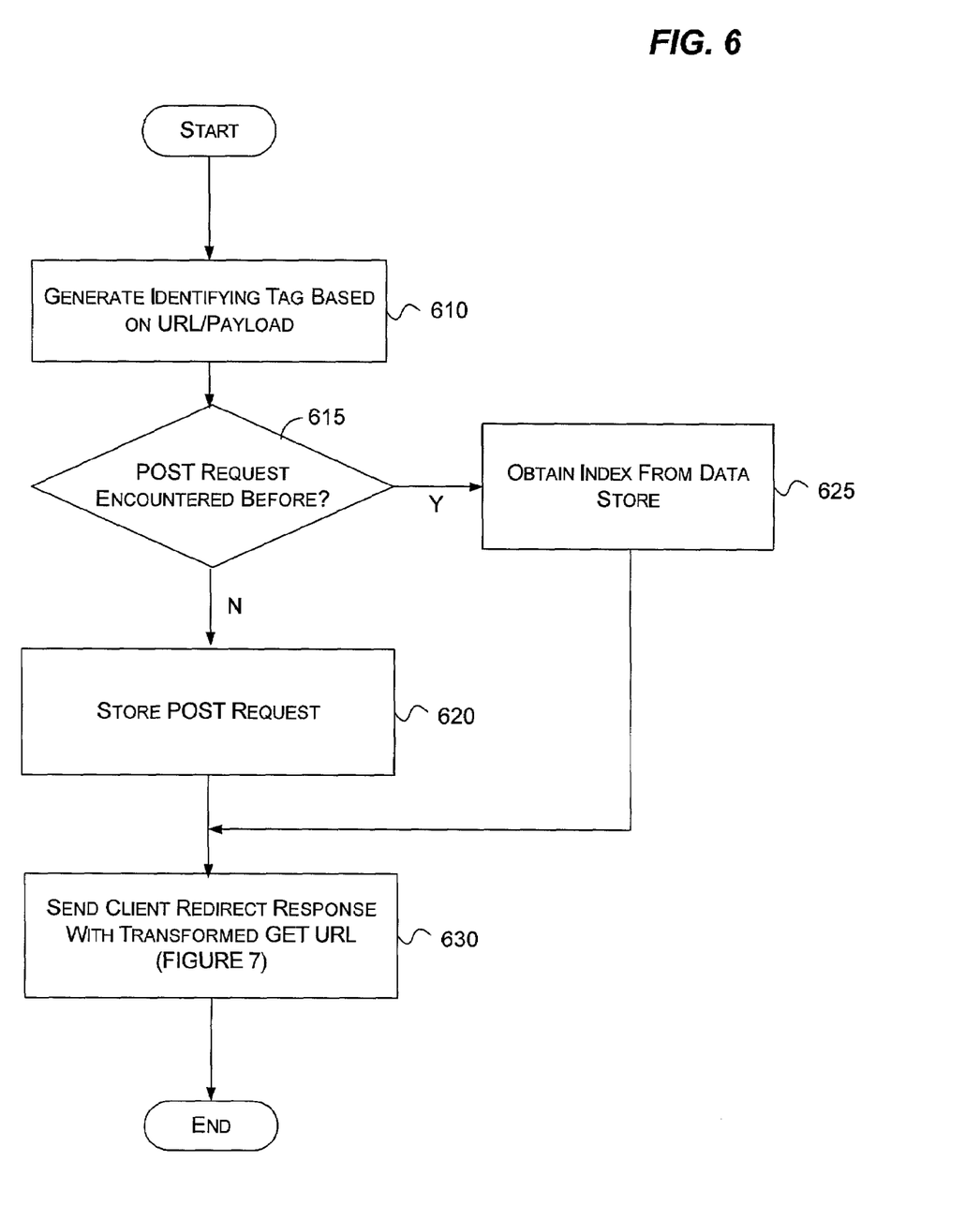
FIG. 6 illustrates a process flow for transforming a POST request into a cacheable request.

FIG. 6 illustrates a process flow for transforming a POST request into a cacheable request, according to an embodiment of the invention.

After a start block, the process moves to block 610 where an identifying tag is generated. The identifying tag is generated based on the original POST request's URL and the attached body of data (the payload). An index value is generated which is unique to the POST request and is used as an index into a data store. Transitioning to decision block 615, the identifying tag is checked to see if the resulting "indexed URL" exists in a data store. When it exists in the data store, the process flows to block 625 where the appropriate index value based on the URL and the payload is retrieved from the data store. From here, the process flows to block 630 where the POST request is transformed into a GET request including the identifying tag and the client receives a redirect response. When the URL is not found in the data store, the process flows to block 620 and the POST request is stored in the data store based on the index value. The process then transitions to block 630, where the POST request is transformed into a GET request including the identifying tag and the client receives a redirect response. The client then requests the content using the transformed GET request (See FIG. 7 and related discussion). Generally, the URL is modified such that the cache engine will be able to recognize the URL when received again as a POST URL that may be cached. The process then steps to an end block and returns to processing other actions.

Operation of Cache Engine Receiving Transformed GET Request

Figure 7:
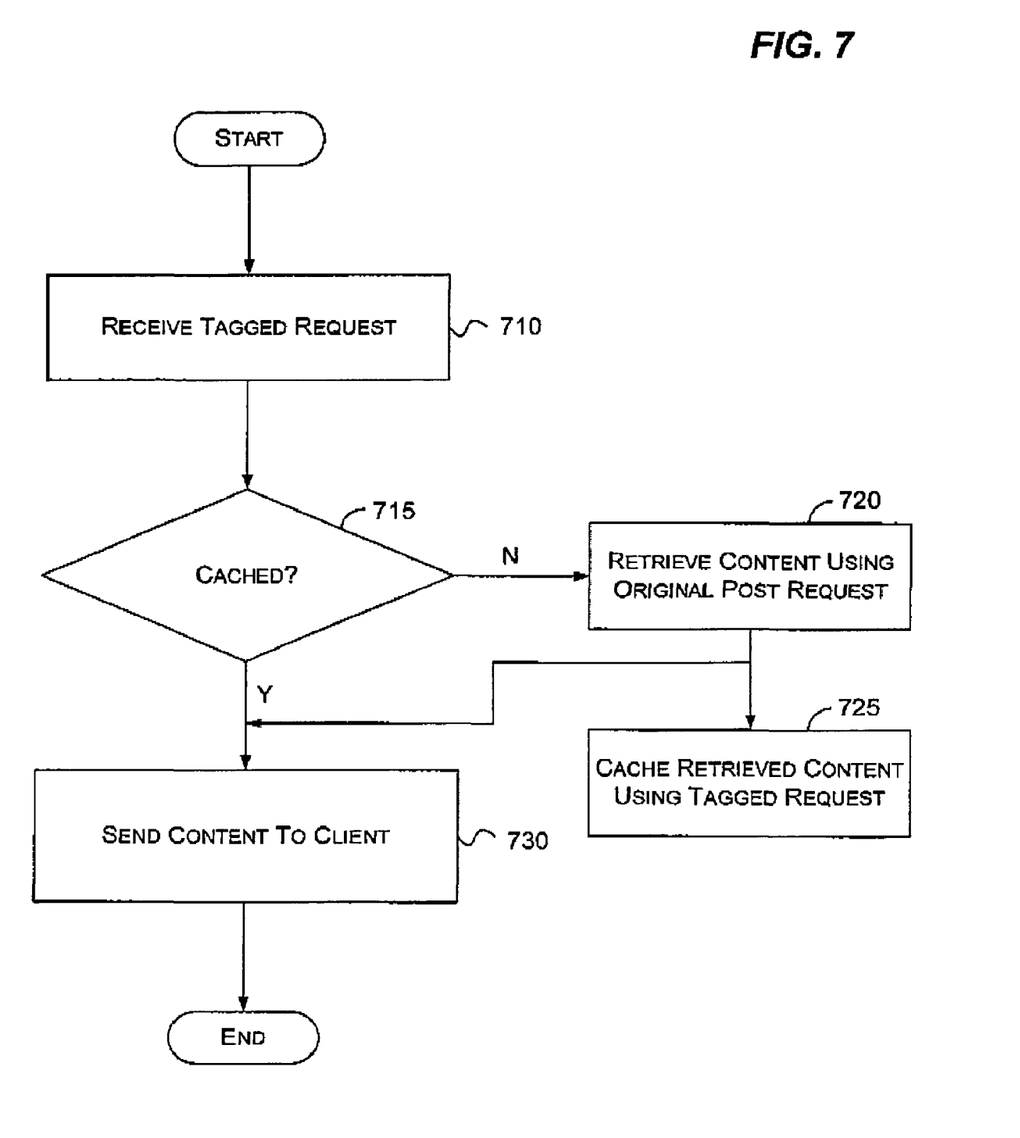
FIG. 7 shows a process flow for when the cache engine receives a tagged GET request.

FIG. 7 shows a process flow for when the cache engine receives a tagged GET request, according to one embodiment of the invention. When the cache engine receives a GET request that has the tag in it (a "tagged" GET request)(block 710), it will attempt to retrieve the URL from the cache based on the index value (decision block 715). When the URL is found in the cache, the cached content is sent to the client (block 730). When the URL is not found in the cache, the process transitions to block 720 where the request is altered to the original POST request. The index found in the URL is examined, and based on the index value the original payload that was used in the original POST request is retrieved from the data store. As discussed above, there must have been an original POST request in order for the index to have been created and included in a URL. The GET request is transformed into a POST request and the retrieved payload is now included as the body of this new POST request. This POST request is then sent to the origin server to retrieve the requested content. When the origin server responds, two things occur. The response data is sent back to the calling client (block 730). At the same time, the received content is stored (block 725).

According to one embodiment, the GET request with the identifying tag is recreated and the GET URL and the response data is pushed into a cache (block 725). At this point, any further requests for the original GET URL will be served out of the cache (until the data is flushed from the cache).

One of the challenges with caching POST requests is that the same URL in the request can yield several different responses based on the request's payload. Therefore, as discussed above, the payload is examined before the request is sent to the origin server such that a unique value could be assigned for the URL/payload combination.

EXAMPLES

In caching POST request data using the system and method described herein, there are at least two different situations may be encountered. The first situation exists when the requested data exists in the cache and the second situation exists when the requested data has not been cached yet. For the first situation, a new URL based on the original URL and an index value retrieved via the original URL and the request's payload is constructed. It is then determined if the URL exists in the cache. If the lookup is successful, the content is returned to the client. If the first situation fails, then the second situation is used. In the second case, the original POST request proceeds normally until the point where the content is coming back from the origin server. At this time, the content is pushed into the cache using the specially created GET URL. The URL upon which the data will be indexed will be a combination of the original URL and a unique index value that is based on the URL and the request's original payload. The content received from the origin server is also sent to the client that made the request.

According to one embodiment of the invention, the Inktomi Traffic Server is utilized. Based on the HTTP specification's view of caching POST requests, Inktomi has opted to disallow the caching of data retrieved from POST requests. To get around this issue the Traffic Server is made to think that it is dealing with a GET request as opposed to a POST request in order to sidestep its standard code flow. The interaction with the Traffic Server is supported via their Software Development Kit (SDK). The SDK includes a collection of API's that allow programmers to "hook" into a variety of places within Traffic Server's normal code flow and interact with the data structures.

With this general basic background, several illustrative examples will now be provided.

Illustrative Examples

Figure 8:
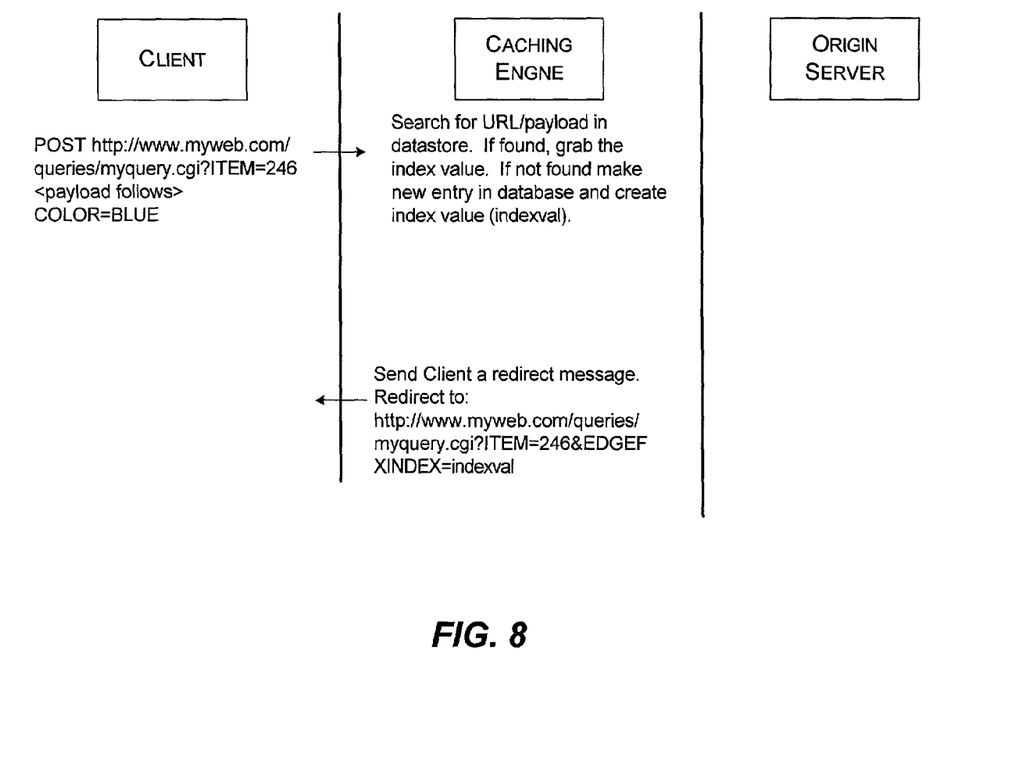
FIG. 8 shows a code path that relates to what happens when a device receives a POST request.

FIG. 8 shows a code path that relates to what happens when a device, such as an EDGE-FX available from F5 Networks, Inc. of Seattle, Wash., receives a POST request from a client.

In this example, the client sends an HTTP POST request of "POST http://www.myweb.com/gueries/myguery.cgi-?ITEM=246" and a payload that consists of "COLOR=BLUE". The caching engine receives the request and a plugin enables a stop in the Traffic Server code at the point where Traffic Server is reading the request. At this point, the caching engine notices that it is receiving a POST request. The engine then attempts to look up the URL/payload combination in a local database that keeps track of the different URL/payload combinations, as well as a unique index, that can be used to identify the combination. When it finds this entry in the database, it extracts the index, otherwise, it adds a new entry for the combination into the database and assigns a unique index for the combination (and retains the index value). The caching engine then constructs a new URL. This URL consists of the original URL with an identifying tag added on to the end of the URL. According to one embodiment of the invention, the identifying tag is "EDGEFXINDEX=indexval" where indexval is the index that was retrieved/retained above. The caching engine then stops messages from being relayed to the origin server. It does so by setting an error condition that allows the traffic server program to stop processing just before a message is sent back to the client. At this point, the message is reworked into an HTTP "redirect" message where the destination for the redirect is the new URL that was just created. The new "redirect" response is then sent back to the client.

Figure 9:
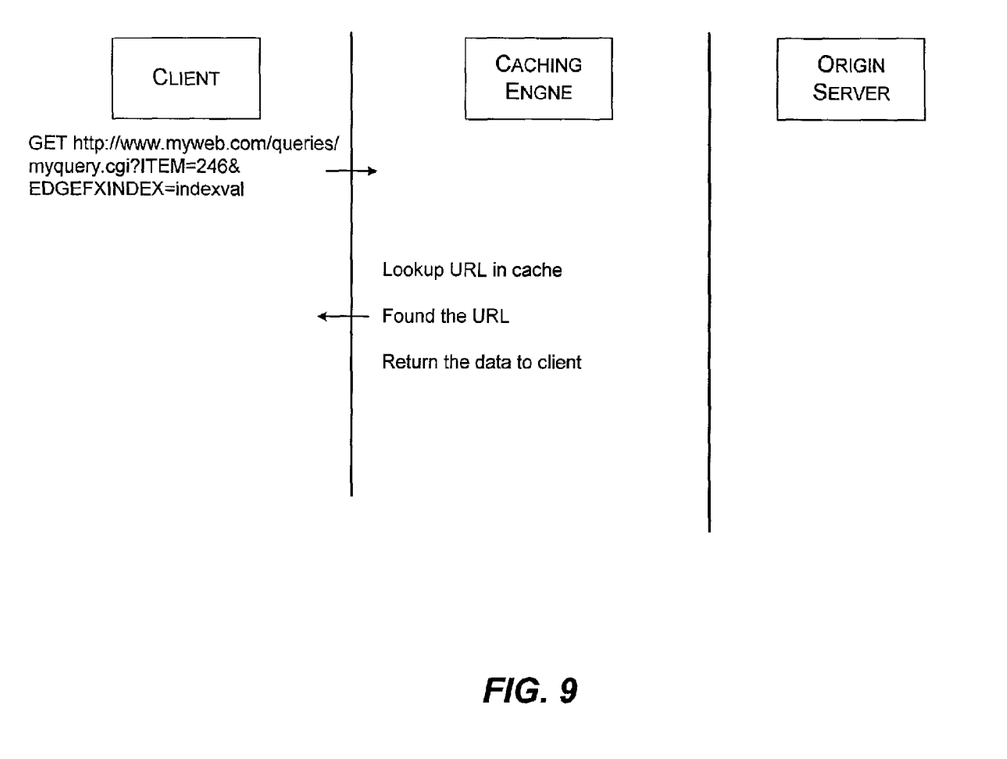
FIGS. 9 and 10 show examples where the cache engine receives one of the special HTTP GET requests that are sent by a client in response to the redirect message described above in FIG. 8, in accordance with aspects of the invention.
Figure 10:
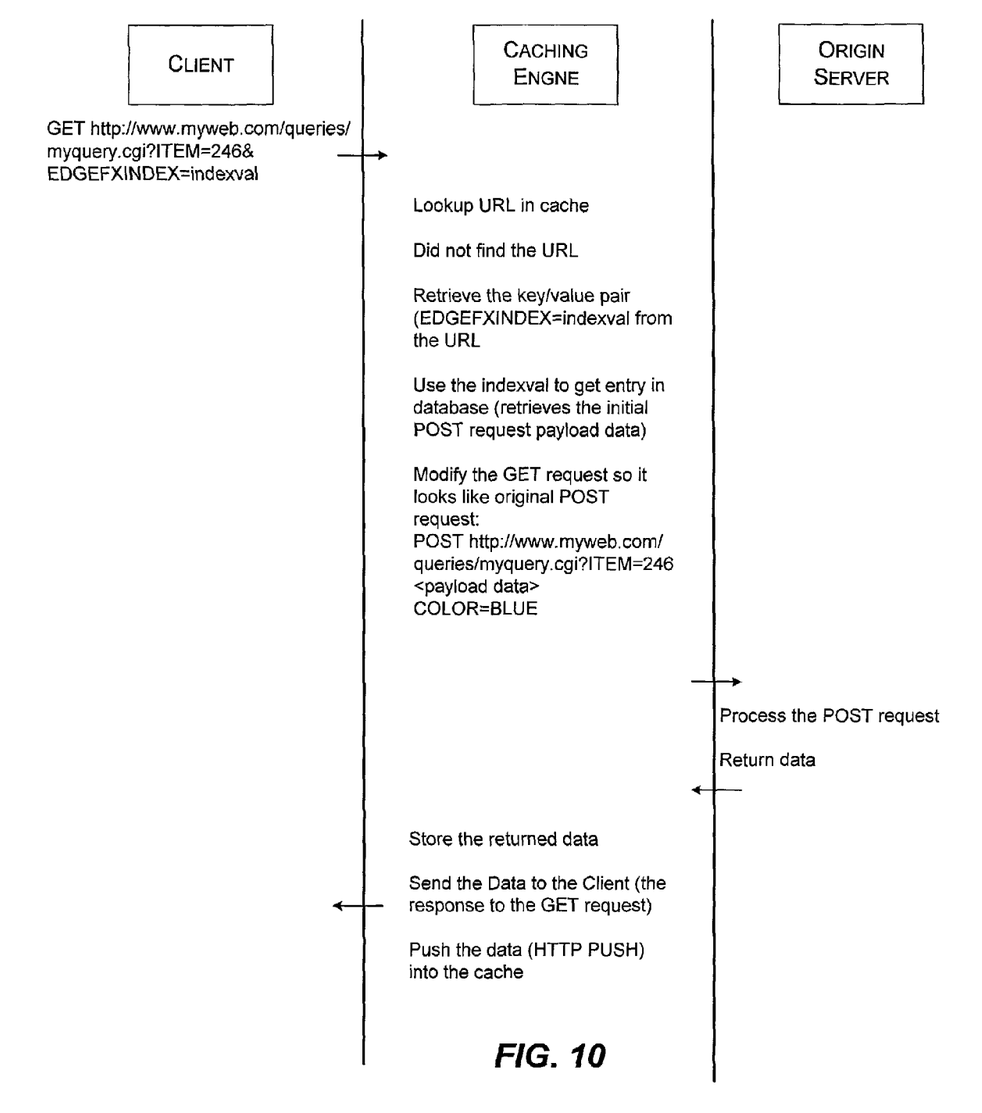

FIGS. 9 and 10 show examples where the cache engine receives one of the created HTTP GET requests that are sent by a client in response to the redirect message described above in FIG. 8.

FIG. 9 illustrates the case where the client sends the redirected GET request where the data is in the cache, according to one embodiment of the invention. When the GET request is received by the caching engine, the plugin examines the query portion of the URL. When the plugin discovers the identifying tag "EDGEFXINDEX=" within the query, the query is identified as one of the special redirects generated by an initial POST request. Upon recognizing this URL, the plugin attempts to determine if the actual data (that is now referred to via a URL with the identifying tag) exists in the cache. If the content exists in the cache, then it is simply returned to the client.

FIG. 10 illustrates the case where the client sends the redirected GET request where the data is not in the cache, according to one embodiment of the invention. The absence of the data in the cache can indicate that this is the first attempt at retrieving the data or perhaps the data was flushed out of the cache for some reason. In this case the identifying tag is examined and the actual value (the above-mentioned indexval) is determined. The indexval is used to lookup appropriate entry in a data store, such as a database. According to one embodiment of the invention, the entry would have been placed in the database during the initial POST request before the redirect response was returned to the client. At the same time, the key/value pair is removed from the query portion of the GET request URL. The resulting URL will be that of the initial POST request. Next, the new request received from the client is changed from a GET request to a POST request. This is all done in preparation for sending what was the original POST request to the origin server. To complete the request, the original payload for the request is retrieved from the database using the indexval found within the identifying tag. According to one embodiment of the invention, the payload is fed back into the request during what the Inktomi Traffic Server SDK refers to as a transformation. With the reformation of the request from a GET to a POST complete, the POST request is passed onto the origin server.

The plugin now waits for a response from the origin server. When a positive response is received, another transformation takes place where the content that is being returned is simultaneously being stored in memory. After all of the data has been received (and stored), the plugin allows the process flow to continue as it normally would and returns the request content to the client. Just before this occurs, however, a thread is spawned off which calls a routine. The routine is passed information about the GET request (which later became the POST request) and the content that was received and stored from the origin server. An appropriate header is formed which includes the exact URL that was originally sent in the GET request (including the key/value pair). Then, using a PUSH method, the data and the header are forced into the cache (the PUSH method is an Inktomi-supported HTTP method that allows data, and the corresponding header, to be placed directly into the cache). According to one embodiment of the invention, this occurs off to the side from the normal processing. A PUSH failure does not pose a problem since the next GET request for the same content will trigger the process to occur again.

Implementation details may change due to changes in the Traffic Server utilized. According to one embodiment of the invention, the Inktomi Traffic Server SDK was utilized.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit or scope of the invention, the invention resides in the claims hereinafter appended.

What is claimed is:

1. A method for caching content responsive to a POST request from a client, the method comprising:

receiving over a network at a cache server a POST request from a client requesting content, wherein the POST request comprises a first uniform resource locator (URL) and a first payload configured as a URL/payload combination;

accessing a database configured to store entries including:
　　a stored combination of a second URL and an associated second payload configured as a stored URL/payload combination from a previous POST request;
　　an index value associated with the stored second URL/payload combination; and
　　cached content responsive to the second URL/payload combination associated with the previous POST request, wherein the cache server retrieves cached content from a content server by recreating the POST request from data in the second URL/payload combination associated with the POST request and applying the recreated request to the content server;

determining whether the first URL/payload combination associated with the received POST request matches the stored second URL/payload combination from the database and one of:
　　if the first URL/payload combination associated with the received POST request matches the stored second URL/ payload combination from the database, retrieving the index value associated with the stored second URL/payload combination; and if the first URL/payload combination associated with the received POST request does not match the stored second URL/payload combination from the database:

storing the first URL/payload combination associated with the POST request in an open entry in the database;

associating a new index value with the stored first URL/payload combination; and sending a redirect GET request over the network to the client including the URL from the stored first or second URL/payload combination and the associated index value, wherein the cache server is configured to respond to the client after receiving a redirect GET request to determine if the index value included in the redirect GET request identifies an entry in the database caching content responsive to the POST request.

2. The method of claim 1, further comprising:

upon determining the index value included in the redirect GET request is associated with an entry in the database that includes no cached content responsive to the URL/payload combination:

retrieving the stored URL/payload combination from the entry in the database; and recreating the POST request from the stored URL/payload combination.

3. The method of claim 2, further comprising:

sending the POST request to a content server storing the content responsive to the POST request;

receiving the content responsive to the POST request; and storing the content responsive to the POST request in the entry identified by the index value.

4. The method of claim 3, further comprising presenting the content responsive to the POST request derived from the redirect GET request to the client.

5. The method of claim 1, wherein the client and the cache server are configured to be disposed in a system in which POST requests are regarded as uncacheable.

6. The method of claim 5, wherein the system adheres to a hypertext transfer protocol (HTTP) standard in which POST requests are regarded as uncacheable.

7. A computer-implemented method, comprising:

receiving a POST request from a client over a network at a cache server, the POST request seeking content from a content server and presenting a first uniform resource locator (URL)/payload combination including a combination of a first URL and a first associated payload;

accessing a local database including a plurality of entries, each of the entries being configured to include a stored URL/payload combination including a combination of a second URL and a second associated payload from a previously presented POST request, an index value associated with the stored second URL/payload combination; and content responsive to the second URL/payload combination associated with the previous POST request wherein the content is retrieved from the content server by recreating the POST request from data in the second URL/payload combination associated with the POST request and applying the recreated request to the content server; and determining whether the first URL/payload combination associated with the received POST request matches the stored second URL/payload combination from the database and one of:

if the first URL/payload combination associated with the received POST request matches the stored second URL/payload combination from the database retrieving the index value associated with the stored second URL/payload combination; if the local database fails to include an entry matching the first URL/payload combination associated with the received POST request:

storing the first URL/payload combination associated with the received POST request in the local database;

associating an index value with the first URL/payload combination associated with the received POST request in the local database;

applying the received POST request to the content server;

receiving content from the content server responsive to the applied POST request; and caching the content responsive to the applied POST request in the local database in association with the stored first URL/payload combination associated with the received POST request and the index value;

generating a GET request corresponding with the received POST request, the GET request including the URL from the stored first or second URL/payload combination and the associated index value; and sending the GET request corresponding with the received POST request to the client, wherein the GET request is configured to allow the client to submit the GET request to the cache server to identify the entry caching the content responsive to the received POST request, wherein the cache server is configured to respond to the client after receiving the GET request to determine if the index value included in the GET request identifies an entry in the database caching content responsive to the POST request.

8. The computer-implemented method of claim 7, further comprising, upon receiving at the cache server the GET request from the client, causing the cache server to send the content to the client by one of:

retrieving the content from the cache server; and retrieving the content from the content server.

9. The computer-implemented method of claim 8, wherein retrieving the content from the content server includes:

recreating the POST request from the URL/payload combination stored with the associated index value;

presenting the POST request to the content server to retrieve the content, receiving the content from the content server; and caching the content in the cache server in association with the URL/payload combination and the associated index value in the cache server.

10. A computer-readable storage medium having stored thereon instructions for operating a cache server, the instructions comprising:

receiving at the cache server a POST request from a client, wherein the POST request includes a first uniform resource locator (URL) and a first payload of information received as part of the POST request, and wherein the cache server is configured to store entries including a stored combination of a second URL and an associated second payload configured as a stored URL/payload combination from a previous POST request an index value associated with the stored second URL/payload combination; and cached content responsive to the second URL/payload combination associated with the previous POST request; wherein the content is retrieved from the content server by recreating the POST request from data in the second URL/payload combination associated with the POST request and applying the recreated request to the content server; and determining whether the cache server maintains an entry representing the POST request including the second URL and the second payload matching with the first URL and first payload received as part of the POST request;

if the entry representing the POST request is not stored in the cache server:

creating a new entry for storing the POST request in the cache server, the new entry including the first URL and the first payload associated with an index value;

if the first URL/payload combination associated with the received POST request matches the stored second URL/payload combination from the database retrieving the index value associated with the stored second URL/payload combination; and generating a GET request corresponding with the POST request, the GET request including the first URL and the index value representing the new entry for storing the POST request, such that when the GET request is presented to the cache server, the cache server is configured to one of:

present to the client content previously retrieved from a content server in response to the POST request being presented to the content server by the cache server and stored in the cache server based on the second URL and second payload and associated index value;

recreate the POST request from the first URL and the first payload stored in the cache server in association with the index value included with the GET request and presenting the POST request to the content server to retrieve the content; and sending the GET request over the network to the client including the URL from the stored first or second URL/payload combination and the associated index value wherein the cache server is configured to respond to the client after receiving the GET request to determine if the index value included in the GET request identifies an entry in the database caching content responsive to the POST request.

11. The computer-readable storage medium of claim 10, further comprising presenting the client with the GET request in a redirect response to the client submitting the POST request.

12. The computer-readable storage medium of claim 10, further comprising, upon the cache server retrieving the content sought by the POST request, storing the content in the cache server in association with the URL and the payload included in the POST request.

* * * * *

UNITED STATES PATENT AND TRADEMARK OFFICE
CERTIFICATE OF CORRECTION

PATENT NO. : 7,640,347 B1  Page 1 of 1
APPLICATION NO. : 10/139149
DATED : December 29, 2009
INVENTOR(S) : Sloat et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this

Ninth Day of November, 2010

David J. Kappos
*Director of the United States Patent and Trademark Office*